United States Patent [19]

Jones

[11] Patent Number: 5,116,118
[45] Date of Patent: May 26, 1992

[54] GEOMETRIC FIEDLITY OF IMAGING SYSTEMS EMPLOYING SENSOR ARRAYS

[75] Inventor: Kenneth L. Jones, Altadena, Calif.

[73] Assignee: The United States of America as represented by the Administrator of the National Aeronautics and Space Administration, Washington, D.C.

[21] Appl. No.: 545,014

[22] Filed: Jun. 28, 1990

[51] Int. Cl.⁵ .................................................. G01P 3/36
[52] U.S. Cl. ............................................ 356/2; 356/28
[58] Field of Search ........................... 356/2, 373, 28; 250/557

[56] References Cited

U.S. PATENT DOCUMENTS

| | | | |
|---|---|---|---|
| 3,997,795 | 12/1976 | Pohl et al. | 250/558 |
| 4,313,678 | 2/1982 | Colvocoresses | 356/2 |
| 4,504,914 | 3/1985 | Hofmann | 356/2 |
| 4,671,650 | 6/1987 | Hirzel et al. | 356/28 |
| 4,708,472 | 11/1987 | Hofmann | 356/2 |
| 4,802,757 | 2/1989 | Pleitner et al. | 356/2 |

FOREIGN PATENT DOCUMENTS 0326128 8/1989 European Pat. Off. ............... 356/2

*Primary Examiner*—Richard A. Rosenberger
*Attorney, Agent, or Firm*—Thomas H. Jones; Guy M. Miller; John R. Manning

[57] ABSTRACT

A sensor assembly to be carried on an aircraft or spacecraft which will travel along an arbitrary flight path, for providing an image of terrain over which the craft travels. The assembly includes a main linear sensor array and a plurality of auxiliary sensor arrays oriented parallel to, and at respectively different distances from, the main array. By comparing the image signals produced by the main sensor array with those produced by each auxiliary array, information relating to variations in velocity of the craft carrying the assembly can be obtained. The signals from each auxiliary array will provide information relating to a respectively different frequency range.

9 Claims, 4 Drawing Sheets

GEOMETRIC FIEDLITY OF IMAGING SYSTEMS EMPLOYING SENSOR ARRAYS

ORIGIN OF THE INVENTION

The invention described herein was made in the performance of work under a NASA Contract and is subject to the provisions of Public Law 96-517 (35 USC 202) in which the Contractor has elected not to retain title.

TECHNICAL FIELD

The present invention relates generally to imaging sensor arrays for use in imaging systems installed in aircraft and spacecraft.

BACKGROUND ART

A variety of systems have been developed for forming images of the surface of the earth or other planetary bodies from an aircraft or a spacecraft. Such systems have proven highly useful in the performance of mapping and surveillance functions, as well as in the unmanned exploration of planetary bodies in the solar system.

The fidelity of the images produced by such systems is significantly influenced by perturbations in the movement of the vehicle carrying the system and various techniques have already been proposed for eliminating, or at least minimizing, the adverse influences of such perturbations on the fidelity of the resulting images. These efforts have included techniques for stabilizing the support for the imaging system, the derivation of a record of such perturbations, and various correlation techniques for comparing images obtained at different points in time.

Attempts to correct for all perturbations which may be experienced by the observation system according to techniques known in the art would require the provision of an extremely large number of sensor elements, a correspondingly large memory and complex logic. Indeed, the quantity of data generated by such an arrangement would prevent the resulting data from being processed or transmitted in real time.

STATEMENT OF THE INVENTION

Accordingly, it an object of the present invention to derive a larger quantity of information about perturbations in the movement of an observation system without requiring the provision of a large number of sensing elements and a corresponding large memory capacity.

A further object of the invention is to increase the geometric fidelity of the images produced by such a system.

A further object of the invention is to produce, in an effective manner, information relating to components of motion of a vehicle over a wide frequency range.

A further object of the invention is to provide information for correcting geometric errors in the image of a scene, or information identifying motion of a vehicle, on a real time basis.

The above and other objects are achieved, according to the present invention, by a sensor assembly to be carried on an aircraft or spacecraft which will travel along an arbitrary flight path, for providing an image of terrain over which the craft travels, the assembly comprising: a main linear imaging sensor array composed of a plurality of photosensitive elements arranged in a row in an image plane for providing terrain image information derived from successive linear terrain regions; and at least two auxiliary imaging sensor arrays each composed of a plurality of photosensitive elements arranged in a row in the image plane for providing terrain image information derived from successive linear terrain regions; wherein the auxiliary imaging sensor arrays are disposed at respectively different distances from the main sensor array in the direction of the flight path.

DETAILED DESCRIPTION OF THE INVENTION

Figure 1:
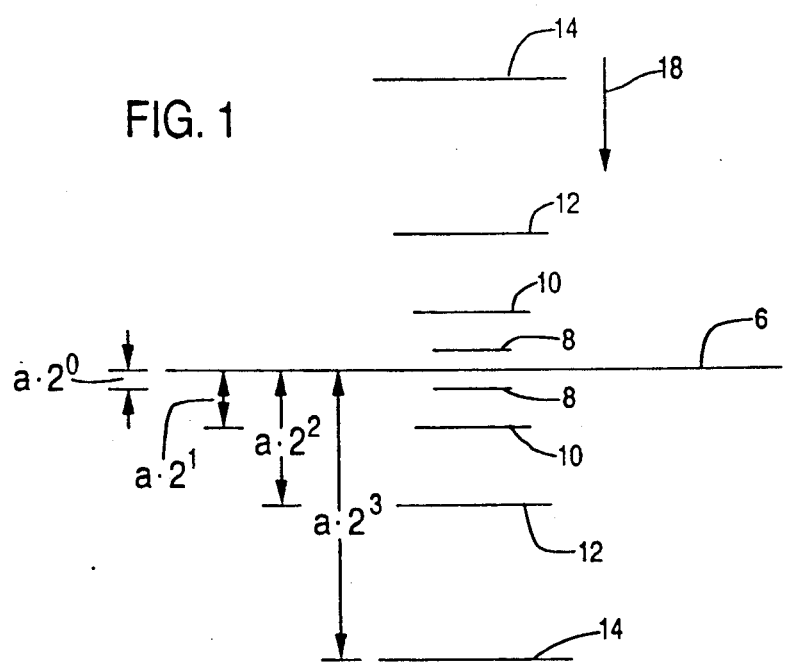
FIG. 1 is a pictorial view of an arrangement of sensors according to a first embodiment of the invention.

Before entering into a discussion of the operation of systems according to the invention, the physical arrangement of a first embodiment, shown in FIG. 1, will be described. This arrangement is composed of a plurality of linear arrays of sensors of the type employed in CCD cameras. There is included a main imaging array 6 and a plurality of pairs of auxiliary imaging arrays 8, 10, 12, and 14.

As will become more readily apparent from the description to be provided below, an arrangement according to the present invention is not limited to four pairs of auxiliary arrays; useful results can be obtained with a smaller number or a larger number of such arrays. As would be expected, a smaller number of arrays will reduce memory capacity requirements and processing time, while a larger number of arrays will increase the fidelity of the information produced.

All of the arrays 6-14 are arranged in a common plane parallel to, or in, the focal plane of a vehicle-borne optical system. Typically, such a system will be installed in an aircraft or a spacecraft and may be mounted on a separately stabilized platform. The platform is assumed to be traveling parallel to the surface being explored, in the direction of an arrow 18 which is typically parallel to the plane of all sensor arrays. Each sensor array 6-14 is composed of a plurality of individual imaging sensors distributed along the length of the associated array and each having a dimension corresponding to one pixel of the image to be formed. Each individual sensor may be a CCD device.

As the arrangement travels in the direction of arrow 18, linear array 6 scans successive lines of the image appearing in the focal plane and the signals generated in the individual sensors of array 6 for each scanning line are conducted, in a conventional manner, to a memory and processing logic. Arrangements of this type are known in the art, one such arrangement being disclosed in U.S. Pat. No. 4,313,678.

If the platform carrying the sensor arrangement travels at a constant velocity and constant altitude above the terrain being observed, and with a fixed orientation relative to that terrain, then the image generated from the signals produced by array 6 will have perfect geometric fidelity, i.e. the resulting image representing a strip of terrain traversed by the arrangement will constitute a perfect representation of that terrain. However, such conditions do not exist in practice and it is known that vehicles traveling through the air or in space will at least periodically undergo variations in at least one of their attitude, altitude, or velocity.

According to the present invention, information identifying, and thus permitting correction, for such variations may be produced by auxiliary sensor arrays 8–14 which, in the illustrated embodiment, are arranged, in pairs in mirror symmetry to main sensor array 6. Each auxiliary sensor array pair will scan a line of the image in the associated focal plane prior and subsequent to scanning of that image line by main sensor array 6. Data obtained by each auxiliary sensor array can be reconstructed into a long, narrow image extending in the direction of arrow 18, then, and using standard digital image correlation techniques, corresponding identifiable targets in the various images can be located and from that differences from the expected number of pixels traveled in the direction of arrow 18 can be determined. By processing the image information produced by any one pair of auxiliary sensors with the image information derived by a corresponding portion of array 6, it is possible to identify the second-order derivative of motion of a target point of the terrain being observed across the focal plane.

Observation of a single target point of the images formed by main sensor array 6 and any one auxiliary sensor array produces information identifying the average linear velocity of the platform carrying the sensor system, relative to the surface being observed, during the time between sensing of the target by one array and sensing of the target by the other array. If multiple targets can be identified in the images developed for each of the two arrays in question, a time history of the velocity of the platform can be obtained.

It will be appreciated that a variation in velocity relative to the surface being observed can, in fact, be the product of a change in linear velocity or pitch.

Velocity variations will occur at a particular frequency which can vary over a large range. The velocity variation frequency which can be detected depends on the spacing between the two linear arrays whose image signals are being compared. For any selected spacing, velocity variations occurring at a particular frequency can be accurately sensed. Higher frequencies can not be detected because they are below the frequency associated with the sampling rate of the array pair; lower frequencies would contain errors because of the difficulty of extrapolating measured target velocities over larger spacings.

According to the present invention, detection of a wide range of velocity variation frequencies is made possible by spacing the auxiliary arrays of each pair at a respectively different distance, in the direction of travel 18, from the main sensing array 6. As a result, correlation of the signals produced by each auxiliary array with the signals produced by the corresponding portion of main array 6 permits detection of a different frequency range of velocity variations.

According to a further feature of the invention, auxiliary arrays 8, 10, 12 and 14 are spaced at varying distances from one another, preferably according to a power law, as indicated by the spacing values on FIG. 1. This leads to an increase in the range of frequencies which can be detected without significantly increasing the number of individual sensors required, and hence the quantity of data which must be processed. Power law variations other than that illustrated in FIG. 1 can, of course, be employed. For example, the spacings could be respective powers of $\sqrt{2}$. Harmonic analysis of the velocity variations obtained at each sampling frequency can then serve to provide an accurate record of the non-linear relative motions of the observation system relative to the target surface.

With relative spacings for the auxiliary sensors, as described above, a wide range of velocity variation frequencies can be detected with only a small addition to the total number of sensors required, as well as to the amount of memory and storage capacity required.

According to one exemplary form of construction of the arrangement shown in FIG. 1, main sensor 6 may, in accordance with the current state of the art, contain several thousand sensor elements, one thousand to six thousand such elements being feasible. Each auxiliary sensor array 8–14, on the other hand, which is centered with respect to sensor array 6, need contain only 32–64 elements. Thus, with the arrangement shown in FIG. 1, the total number of elements constituting the auxiliary sensors would increase the total number of sensor elements by approximately 10%.

According to one optional feature, shown in FIG. 1, the width of the auxiliary sensor arrays may increase progressively, or flare with increasing distance from main sensor array 6. This is achieved by giving successive sensor arrays a progressively larger number of elements and the increase may correspond to a flare angle of up to 4°. The purpose of such flaring is to compensate for slight deviations in the orientation of the focal plane relative to the ground track. Thus, if the focal plane is tilted or skewed slightly, the same image point would still traverse each sensor array.

A system according to the invention could be constructed with only one set of auxiliary sensor arrays 8–14, all located to one side of main sensor array 6. However, when two sets of auxiliary sensors are provided and are disposed symmetrically with respect to sensor 6, as shown in FIG. 1, the signals from any corresponding pair of auxiliary sensor arrays and main sensor array 6 can be processed together to provide an indication of the second-order derivative of motion of a target relative to the sensor assembly, permitting a further reduction in ambiguities.

Figure 2:
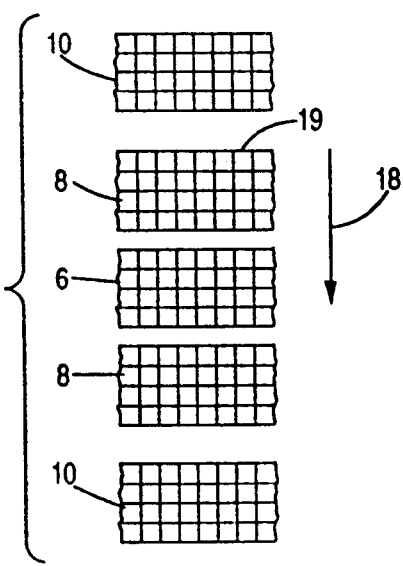
FIG. 2 is a detail view, to an enlarged scale, of a portion of one form of construction of the arrangement of FIG. 1.

One preferred form of construction for arrays 6–14 is illustrated in a detail view in FIG. 2. According to this form of construction, each sensor array 6–14 is constituted by a four-line time delay integration (TDI) sensor array composed of four lines of CCD sensor elements 19, so that four elements 19 are associated with each picture element or pixel. In the operation of such a device, a line in the image plane is scanned successively by each row of elements 19, the signal induced in each element is transferred to the associated element in the next row, and the resulting combined information is outputted from the elements of the last row. With this arrangement, the charge accumulated in each element is transferred to the associated element in the next row, where it is added to the charge accumulated by that element. Thus, the purpose of this arrangement is to increase the total charge which produces an output signal, thereby making the sensor more effective in low light situations.

It will be appreciated that, according to principles known in the art, use can be made of sensors which are responsive to light in the visible spectrum, or sensors which are responsive to radiation in other spectral regions, e.g. infrared radiation. Linear sensor arrays responsive to different spectral regions can be combined in a single unit.

Basically, an arrangement of the type shown in FIG. 1 will provide information relating to variations in velocity in the direction of arrow 18. Such velocity variations can result from variations in the pitch of the vehicle carrying the observation system.

Figure 3:
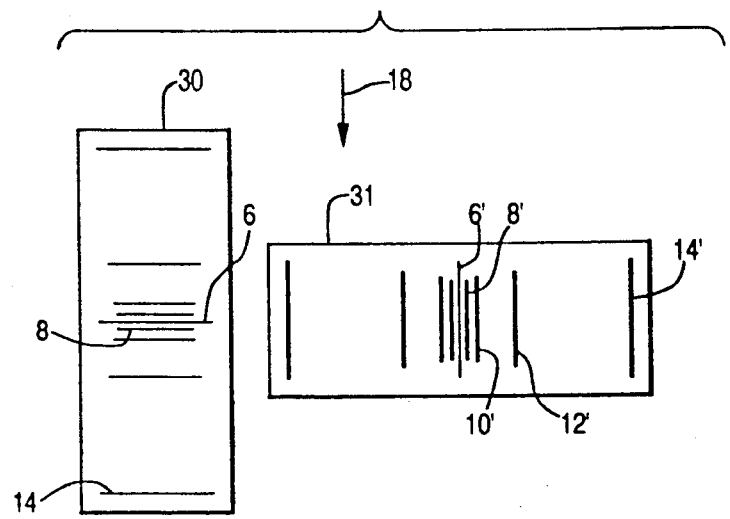
FIGS. 3-6 are pictorial views of alternate embodiments of arrays according to the present invention.

The invention could be extended to permit the detection of velocity variations perpendicular to the direction of travel 18. One embodiment of this type is shown in FIG. 3 where an arrangement 30 as shown in FIG. 1 is supplemented by a structurally identical arrangement 31 oriented at right angles to arrangement 30. Thus, sensor arrangement 31 includes a main line sensor array 6' and auxiliary sensor arrays 8', 10', 12' and 14'. In a manner similar to that described above, signals from the sensor arrays of arrangement 31 will provide information identifying velocity variations in the direction perpendicular to direction 18.

Figure 4:
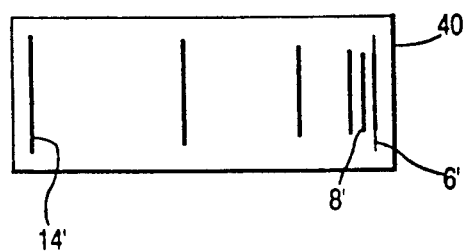

FIG. 4 illustrates one embodiment of a sensor arrangement according to the invention having auxiliary sensor arrays 8'-14' disposed only to one side of a main sensor array 6. This arrangement could be added directly to the arrangement shown in FIG. 1.

Figure 5:
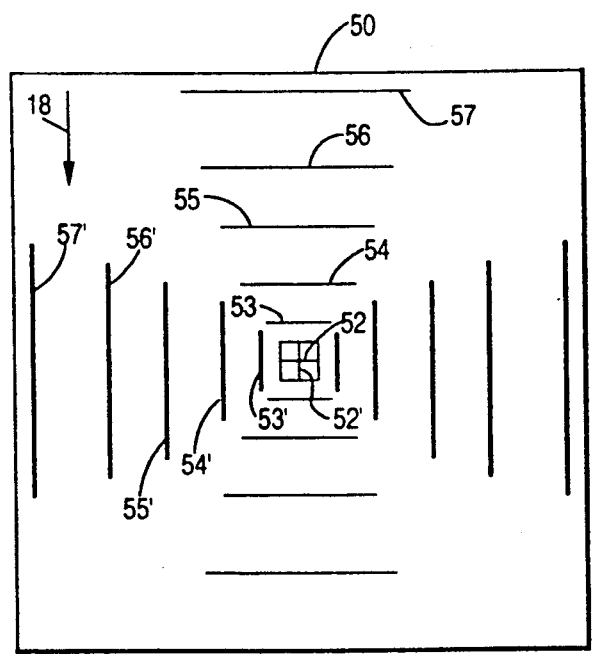

FIG. 5 illustrates a more compact arrangement 50 including relatively short main sensor arrays 52 and 52', a first set of auxiliary sensor arrays 53, 54, 55, 56 and 57 associated with main sensor array 52, and a second set of auxiliary sensors array 53', 54', 55', 56' and 57' associated with main sensor array 52 prime. The signals from each group of sensor array would be combined in the same manner as that described above.

Figure 6:
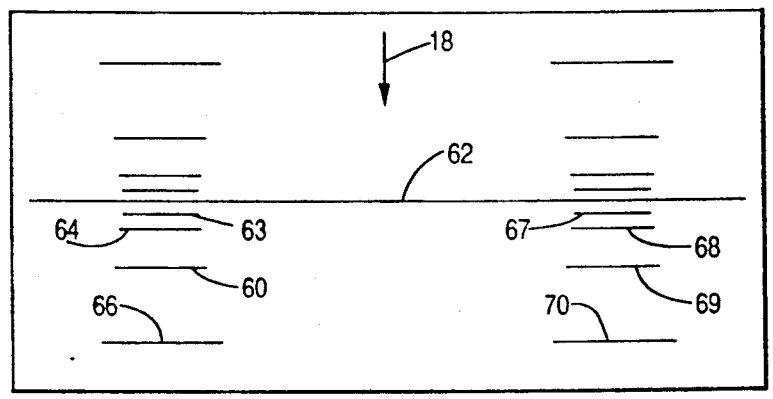

A further embodiment of the invention is shown in FIG. 6 and includes a single linear main sensor array 62 associated with two sets of auxiliary sensor arrays 63-66 and 67-70. An arrangement of this type can provide information relating to velocity variations in the direction of travel 18 and, by comparison of the information obtained from sensor arrays 63-66 with the information obtained from sensor arrays 67-70 can provide information relating to velocity variations associated with yaw movements.

It will be understood that in all of the illustrated embodiments, the desired information will be obtained by combining the signals from the various linear sensors in accordance with procedures well known in the art. It will further be appreciated that other structural arrangements according to the invention would be readily apparent based on the above description and the illustrations provided in the drawing.

In further accordance with the invention, three mutually orthonogal sensor arrays could be installed to provide information regarding velocity and attitude variations in three dimensions. With such an arrangement, a second optical system and image plane could be provided.

Figure 7:
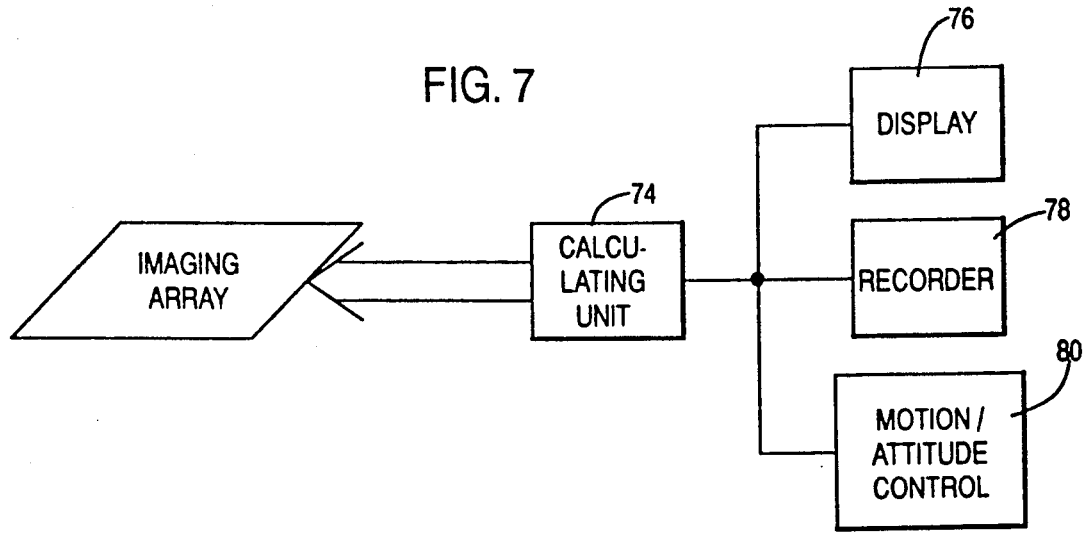
FIG. 7 is a block diagram showing the basic components of a system for processing image information produced by a sensor array according to the present insertion.

Any one of the disclosed embodiments of the invention can be utilized, as shown in FIG. 7, in a system employing a calculating unit 74 which will process signals from the sensor arrays according to the principle known in the art. Calculating unit 74 can be configured to drive a display 76 which displays a corrected image of the terrain being scanned, and/or a recorder 78 and/or a motion and attitude control unit 80 which controls the craft to correct for deviations form the desired velocity and attitude.

The exact mathematical method needed to calculate the time-history of the motion of the platform carrying the imaging system from the imaging data may vary from application to application. However, all of the methods involve the following steps: 1) deriving velocity vectors in both the along-track and cross-track directions of the image plane using image correlation to "track" the same object as it passes from sensor to sensor, 2) combining those vectors by using a least-squares curve fit to derive a continuous time history of the velocity vectors over time, and 3) integrating the resulting velocities to obtain a positional "offset" which can be employed, according to techniques known to the art, to reposition imaging lines to their proper relative positions, thus improving the geometric fidelity of the image.

Figure 8:
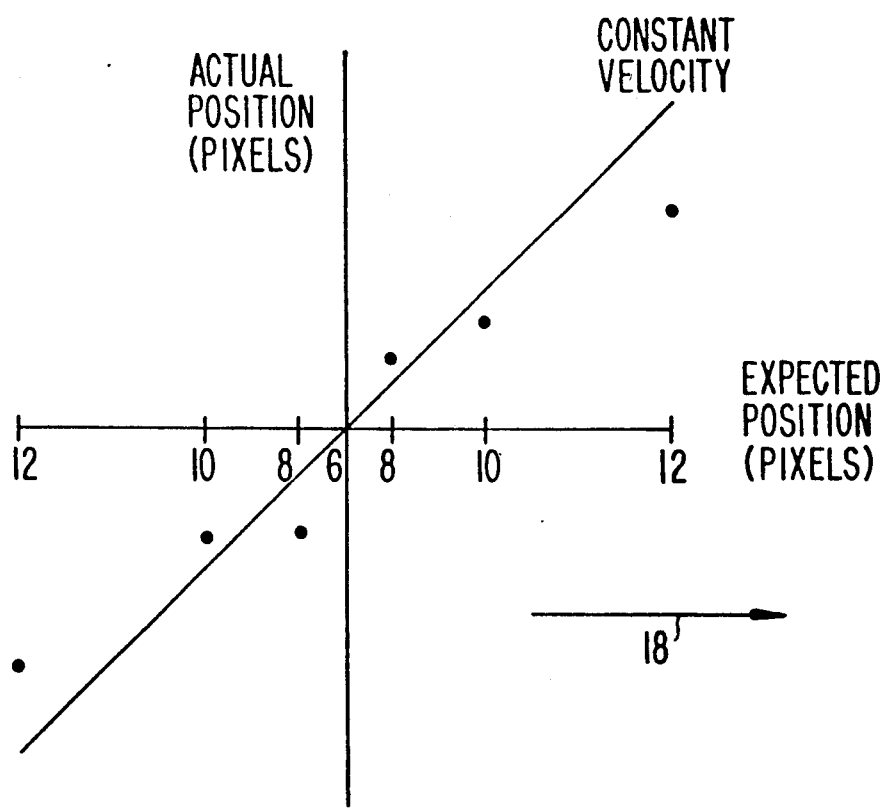
FIG. 8 is a graph illustrating the derivation of position and velocity information from signals produced by a sensor assembly according to the present invention.

One can plot, on a graph, expected positions (based on the physical geometry of the sensor) vs. actual positions (based on tracking objects using image correlation) of a target as its image passes various sensors. If the motion is constant, the line is a straight line, as shown by the constant velocity line in FIG. 8; if the motion is irregular, the result might look like the points plotted in FIG. 8. This illustration considers only along-track motion; motion perpendicular to the along-track motion can be expressed in the same way.

Standard curve fitting algorithms—for example a Taylor series polynomial expansion—allow one to find a curve which passes substantially through all points. If one has some a priori knowledge of expected motion, one might use a specific model rather than a more general polynomial or harmonic expansion.

The velocity at the main imaging line (6) is then found from the derivative of that curve at the origin. The closer spaced points near the origin preserve the accuracy of the polynomial at higher frequencies, while the more widely spaced points keep the entire curve well-behaved at lower frequencies. The velocities obtained at multiple times using multiple targets can then be numerically integrated to obtain the complete representation of the expected position vs. actual position in the main image. An alternative to numerical integration of velocities (which might introduce roundoff errors) would be to preserve all of the above polynomials and solve them using Kalman filtering techniques.

Additionally, if two separate recognizable targets are visible in two imaging lines at the same time, then their absolute spacing in a reconstructed image, in pixels, is known directly.

It is significant that the above method is based entirely on the physical spacing of the sensors and is independent of the readout rate of each sensor. If one includes the readout rate of the sensors (known from the electronic design), it is possible to reconstruct the distance to a target.

The invention may be embodied in other specific forms without the departing from the spirit or essential characteristics thereof. The present embodiments and examples are, therefore, to be considered in all respects as illustrative and not restrictive, the scope of the invention being indicated in the appended claims and all claims that come within the scope and equivalency of the claims are, therefore, intended to be embraced therein.

I claim:

1. A terrain imaging system comprising:
   a sensor assembly to be carried on an aircraft or spacecraft which will travel along an arbitrary flight path, for providing an image of terrain over which the craft travels, said assembly comprising a main linear imaging sensor array and two groups of auxiliary linear imaging sensor arrays, each said array being composed of a plurality of photosensitive elements arranged in a row in an image plane for providing terrain image information derived from successive linear terrain regions, each group of auxiliary sensor arrays being composed of a first auxiliary sensor array and a second auxiliary sensor array, with said first auxiliary sensor array being disposed between said main sensor array and said second auxiliary sensor array and being separated from said main sensor array and said second auxiliary sensor array by respectively different distances in the direction of the flight path, and each group of auxiliary sensor arrays being disposed to a respective side of said main sensor array; and
   signal processing means connected to said main sensor array and to each of said auxiliary sensor arrays for comparing the terrain image information provided by said main sensor array with the terrain image information provided by each of said auxiliary sensor arrays.

2. A system as defined in claim 1 wherein all of said sensor arrays extend transversely to the flight path.

3. A system as defined in claim 2 wherein said auxiliary sensor arrays are parallel to said main sensor array.

4. A system as defined in claim 3 wherein all of said sensor arrays extend perpendicularly to the flight path.

5. A system as defined in claim 1 wherein each said group of auxiliary sensor arrays contains at least four of said auxiliary sensor arrays.

6. A system as defined in claim 1 wherein each said sensor array is a time delay integration device composed of a plurality of parallel rows of charge coupled delay sensor elements.

7. A system as defined in claim 1, further comprising at least two additional auxiliary imaging sensor arrays each composed of a plurality of photosensitive elements arranged in a row extending parallel to one of said first and second auxiliary imaging sensor arrays of one of said groups in the image plane and spaced from said first and second auxiliary imaging sensor arrays of said one of said groups in the direction in which said first and second auxiliary sensor arrays of said one of said groups extend.

8. A system as defined in claim 1 further comprising at least two further imaging sensor arrays each composed of a plurality of photosensitive elements arranged in a row extending transversely to said main imaging sensor array and disposed in the image plane.

9. A system as defined in claim 1 wherein the respective distances between said auxiliary sensor arrays of each said group and said main sensor array correspond to a power law progression.

* * * * *